No. 870,871. PATENTED NOV. 12, 1907.
W. G. EGGLETON.
SHACKLE.
APPLICATION FILED AUG. 15, 1907.
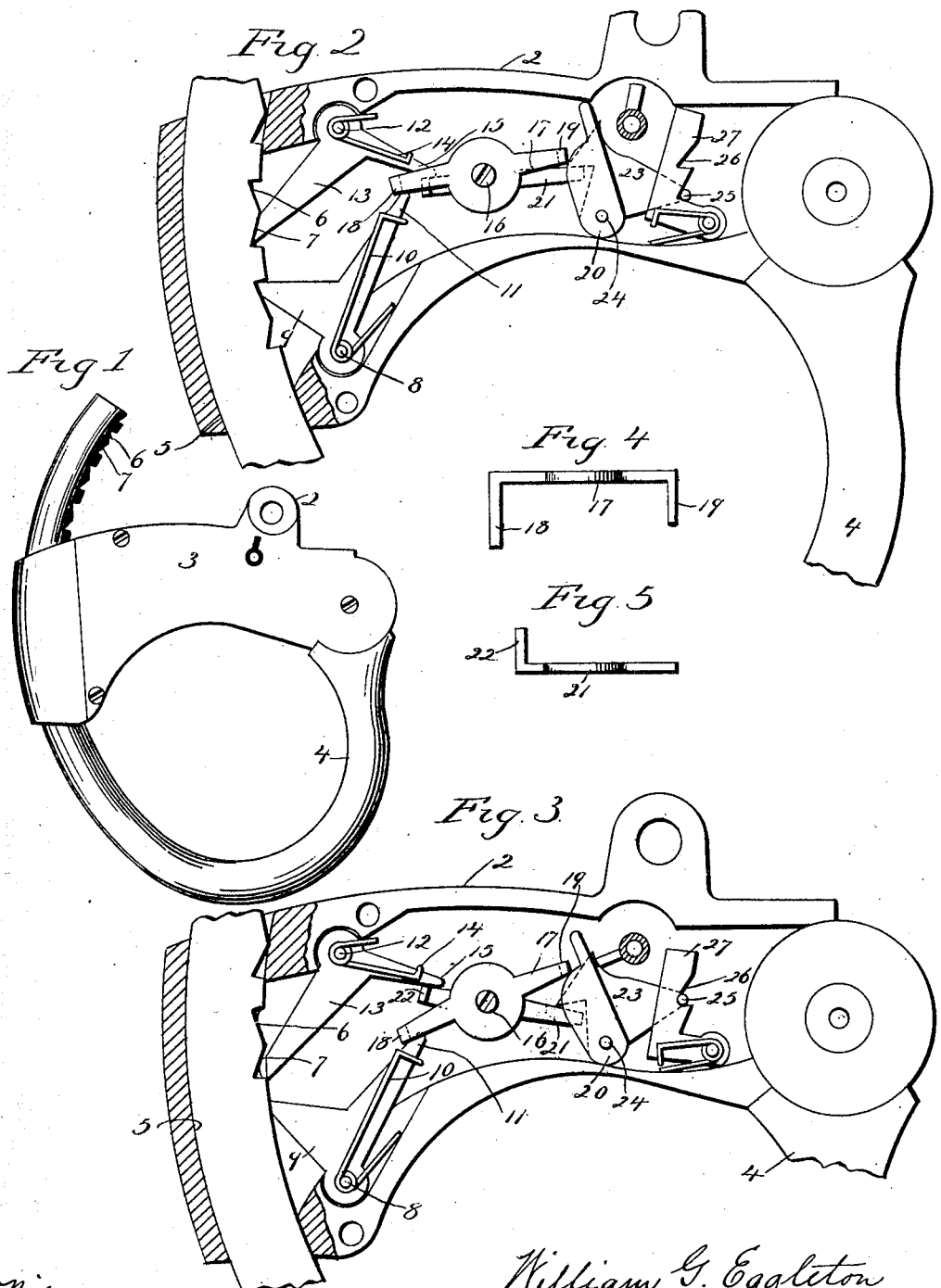

UNITED STATES PATENT OFFICE.

WILLIAM G. EGGLETON, OF WATERBURY, CONNECTICUT, ASSIGNOR TO THE MATTATUCK MFG. CO., OF WATERBURY, CONNECTICUT, A CORPORATION.

SHACKLE.

No. 870,871.  Specification of Letters Patent.  Patented Nov. 12, 1907.

Application filed August 15, 1907. Serial No. 388,707.

*To all whom it may concern:*

Be it known that I, WILLIAM G. EGGLETON, a citizen of the United States, residing at Waterbury, in the county of New Haven and State of Connecticut, have invented a new and useful Improvement in Shackles; and I do hereby declare the following, when taken in connection with the accompanying drawings and the letters of reference marked thereon, to be a full, clear, and exact description of the same, and which said drawings constitute part of this specification, and represent, in—

Figure 1 a top or plan view of a single shackle constructed in accordance with my invention. Fig. 2 a top or plan view of the same with the cap of the case removed, showing the arm in its locked position. Fig. 3 a similar view with the arm partially broken away and showing one of the dogs locked in its retired position. Fig. 4 an edge view of one of the dog-operating levers. Fig. 5 an edge view of the other dog-operating lever.

This invention relates to an improvement in shackles, or, as they are commonly called, hand cuffs and leg irons, the object of the invention being to produce a shackle which is not only more secure against possibility of picking or accidental opening, but also locks the shackle arm against movement in either direction; and the invention consists in the construction hereinafter described and particularly recited in the claims.

The shackle consists of a body or case 2 closed by a cover or cap 3. Hinged to one end of the case is an arm 4 which arm is adapted to pass through an opening 5 formed for it in the opposite end of the case, the arm being provided with notches 6 and 7, the notches being arranged in pairs and turned in opposite directions. Mounted within the case upon a post 8 is a dog 9 in position to engage with the notches 6 to prevent the withdrawal of the arm. This dog is held in its locking position by a spring 10 bearing against the tail 11 of the dog. At the opposite side of the case upon a post 12 is a second locking dog 13 which is adapted to engage with the notches 7 in the arm, this dog being held in its closed position by a spring 14 bearing against the tail 15. Mounted upon a stud or post 16 is a lever 17 having an inwardly projecting finger 18 which engages with the tail 11 of the dog 9, and at the opposite end with an inwardly projecting finger 19 which is engaged by a tumbler 20 adapted to be moved by one of the bits of a key. Mounted upon the same post 16 is a lever 21 having an upwardly extending finger 22 which engages with the tail 15 of the dog 13, the opposite end of the lever extending into the path of the tumbler 23 which is turned by another bit of the key. The tumblers are mounted upon a post 24 and the inner end of the tumbler 23 has a pin 25 which is adapted to be engaged by a notch 26 formed in a spring latch 27.

In the position shown by the parts in Fig. 2 of the drawings it will be seen that the dogs 9 and 13 engage with the notches 6 and 7 in the arm, and that arm is locked against movement in either direction, and when so locked one dog prevents access to the other dog so that it is difficult, if not impossible, to move both dogs out of engagement with the rack so as to pick the lock. To open the lock, a key is turned to move the tumblers 20 and 23 which turn the levers 17 and 21 so as to force the fingers 18 and 22 against the respective tails 11 and 15 of the dogs 9 and 13 so as to turn those dogs out of the notches 6 and 7 leaving the arm free to be withdrawn. This turning of the tumblers brings the pin 25 in position to be engaged by the notch 26 of the latch 27 as shown in Fig. 3 of the drawings, so that the dog 13 is held in its unlocked position even when the key is turned in position to be withdrawn from the case. The parts thus positioned as shown in Fig. 3 of the drawings permits the arm to be moved into the case, and will be locked against withdrawal so that a key is not required to lock the shackle. After the arm is closed to the desired extent, the key is rotated in the opposite direction to bring the bits against the latch 27 which is slightly turned so as to release the pin 25 allowing the tumbler 23 to turn and throw the dog 13 into its locking position so that both dogs are again engaged with the arm.

It will thus be seen that a shackle is produced which permits of its attachment with the same convenience as previous shackles by having the two dogs as more positively locked against movement in either direction and the possibility of picking is reduced.

I claim:—

1. In a device of the class mentioned the combination with the case thereof, of an arm hinged thereto and formed with reversely arranged locking notches, a pair of spring dogs pivoted in the case and adapted to engage with said notches, and means for turning said dogs.

2. In a device of the class mentioned, the combination with the case thereof, of an arm hinged thereto and formed with reversely arranged locking notches, a pair of spring dogs mounted in the case and adapted to engage with said notches, a pair of levers mounted in the case and respectively adapted to move said dogs, and means for turning said levers, substantially as described.

3. In a device of the class mentioned, the combination with the case thereof, of an arm hinged thereto and formed with reversely arranged locking notches, a pair of spring dogs pivoted in the case and adapted to engage with said notches, a pair of levers mounted in said case and respectively engaging with said dogs, and a pair of tumblers mounted in the case and respectively engaging with said levers, substantially as described.

4. In a device of the class mentioned, the combination with the case thereof, of an arm hinged thereto and formed with reversely arranged locking notches, a pair of spring dogs pivoted in the case and adapted to engage with said notches, a pair of levers mounted in the case and adapted respectively to engage with said dogs, a pair of tumblers mounted in said case and adapted to engage with said levers, one of said tumblers provided with a pin, and a spring latch adapted to engage with said pin whereby one of said dogs may be held out of engagement with said arm, substantially as described.

In testimony whereof, I have signed this specification in the presence of two subscribing witnesses.

WM. G. EGGLETON.

Witnesses:
CHARLES E. PUFFER,
GEO. E. JUDD.